US012730598B2

(12) United States Patent
Zhang

(10) Patent No.: US 12,730,598 B2
(45) Date of Patent: Sep. 8, 2026

(54) METHOD, DEVICE, AND MEDIUM FOR DETERMINING IMAGE FOR DISPLAY

(71) Applicant: Beijing Youzhuju Network Technology Co., Ltd., Beijing (CN)

(72) Inventor: Qi Zhang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/890,529

(22) Filed: Sep. 19, 2024

(65) Prior Publication Data

US 2025/0013414 A1 Jan. 9, 2025

(51) Int. Cl.
*G09G 5/00* (2006.01)
*G06F 3/14* (2006.01)

(52) U.S. Cl.
CPC .................................... *G06F 3/14* (2013.01)

(58) Field of Classification Search
CPC ........ G06F 3/14; G06F 3/04845; G06F 40/12; G06F 40/216; G06F 40/279; G06V 10/993; G06V 20/30; G06T 2200/24
USPC .......................................................... 345/156
See application file for complete search history.

(56) References Cited

U.S. PATENT DOCUMENTS

2016/0357406 A1* 12/2016 Lee ........................ G06V 10/17
2024/0295953 A1* 9/2024 Zakharov ................ G06T 11/00
2024/0296535 A1* 9/2024 Bakunov ............... G06T 7/0002
2024/0394479 A1* 11/2024 Pathak .................. G06F 40/295

* cited by examiner

*Primary Examiner* — Jennifer T Nguyen
(74) *Attorney, Agent, or Firm* — Alleman Hall LLP

(57) ABSTRACT

Implementations of the present disclosure provide a method, device, and medium for determining an image for display. The method comprises obtaining a plurality of candidate images associated with an object. The method further comprises generating a prompt for a language model based on the plurality of candidate images. The method further comprises obtaining a plurality of attractiveness ranks corresponding to the plurality of candidate images by feeding the prompt to the language model. The method further comprises determining a plurality of probability distributions corresponding to the plurality of candidate images based on the plurality of attractiveness ranks. In addition, the method further comprises determining a target image for display from the plurality of candidate images based on the plurality of probability distributions.

18 Claims, 8 Drawing Sheets

METHOD, DEVICE, AND MEDIUM FOR DETERMINING IMAGE FOR DISPLAY

BACKGROUND

In modern mobile and web applications, several platforms allow users to upload images related to a specific object or subject, and these platforms use various algorithms or criteria to select and display the most relevant or appealing image to other users. For example, some e-commerce platforms may obtain multiple images of a product from different angles or in different settings. Then, the platforms may select the most visually appealing or contextually relevant image based on several factors.

For another example, in some news aggregation platforms, several images might be associated with a single article. These images may include stock photos, author-provided images, or automatically generated thumbnails from video content. The platforms may use algorithms to determine which image to display in the preview.

SUMMARY

In a first aspect according to some implementations of the present disclosure, a method for determining an image for display is provided. The method comprises obtaining a plurality of candidate images associated with an object. The method further comprises generating a prompt for a language model based on the plurality of candidate images. The method further comprises obtaining a plurality of attractiveness ranks corresponding to the plurality of candidate images by feeding the prompt to the language model. The method further comprises determining a plurality of probability distributions corresponding to the plurality of candidate images based on the plurality of attractiveness ranks. In addition, the method further comprises determining a target image for display from the plurality of candidate images based on the plurality of probability distributions.

In a second aspect according to some implementations of the present disclosure, an electronic device comprising a memory and a processor is provided. The memory is configured to store computer instructions which, when executed by the processor, cause the processor to obtain a plurality of candidate images associated with an object. The instructions further cause the processor to generate a prompt for a language model based on the plurality of candidate images. The instructions further cause the processor to obtain a plurality of attractiveness ranks corresponding to the plurality of candidate images by feeding the prompt to the language model. The instructions further cause the processor to determine a plurality of probability distributions corresponding to the plurality of candidate images based on the plurality of attractiveness ranks. In addition, the instructions further cause the processor to determine a target image for display from the plurality of candidate images based on the plurality of probability distributions.

In a third aspect according to some implementations of the present disclosure, a non-transitory computer-readable medium is provided. The medium comprises instructions stored thereon which, when executed by a processor, cause the processor to obtain a plurality of candidate images associated with an object. The instructions further cause the processor to generate a prompt for a language model based on the plurality of candidate images. The instructions further cause the processor to obtain a plurality of attractiveness ranks corresponding to the plurality of candidate images by feeding the prompt to the language model. The instructions further cause the processor to determine a plurality of probability distributions corresponding to the plurality of candidate images based on the plurality of attractiveness ranks. In addition, the instructions further cause the processor to determine a target image for display from the plurality of candidate images based on the plurality of probability distributions.

Any of the one or more above aspects in combination with any other of the one or more aspects. Any of the one or more aspects as described herein. This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with reference to the following figures.

DETAILED DESCRIPTION

Figure 1:
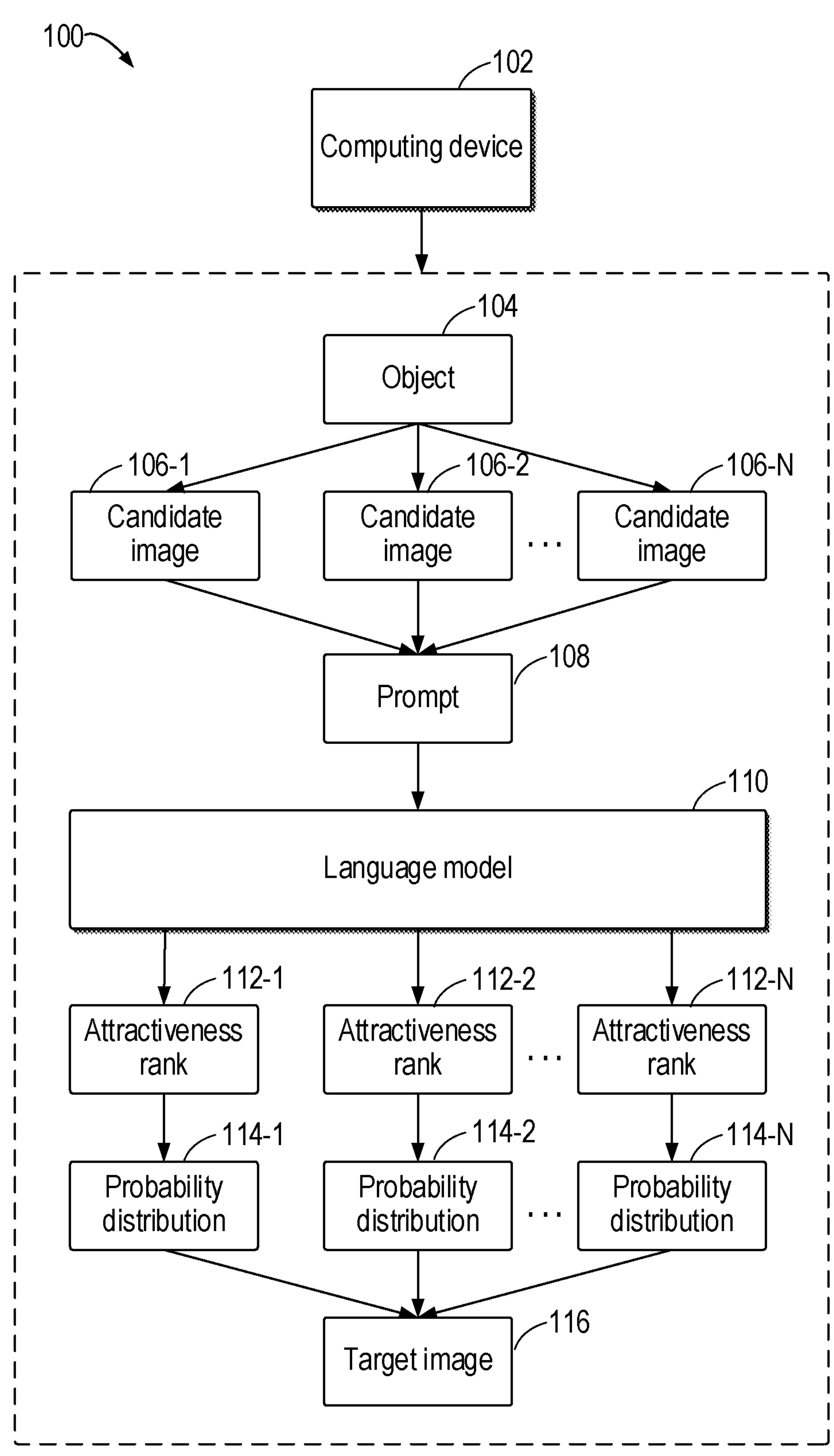
FIG. 1 illustrates an example environment in which example implementations of the present disclosure may be implemented.

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects may be practiced as methods, systems or devices. Accordingly, aspects may take the form of a hardware implementation, an entirely software implementation, or an implementation combining software and hardware aspects. The following detailed description is therefore not to be taken in a limiting sense, and the scope of the present disclosure is defined by the appended claims and their equivalents. A plurality of steps recorded in method implementations in the present disclosure may be performed in different orders and/or in parallel. In addition, additional steps may be included and/or the execution of the illustrated steps may be omitted in the method implementations. The scope of the present disclosure is not limited in this aspect.

The term "including" used herein and variations thereof are an open-ended inclusion, namely, "including but not limited to". The term "based on" is interpreted as "at least partially based on". The term "an embodiment" means "at least one embodiment"; the term "another embodiment" means "at least one additional embodiment"; and the term "some embodiments" means "at least some embodiments". The related definitions of other terms will be provided in the subsequent description. Concepts such as "first" and "second" mentioned in the present disclosure are only for distinguishing different apparatuses, modules, or units, and are not intended to limit the order or relation of interdependence of functions performed by these apparatuses, modules, or units. Variants of "one" and "a plurality of" mentioned in the present disclosure are illustrative and not restrictive, and those skilled in the art should understand that unless otherwise explicitly specified in the context, the modifiers should be understood as "one or more". The names of messages or information exchanged between apparatuses in the implementations of the present disclosure are provided for illustrative purposes only, and are not used to limit the scope of these messages or information. Data (including the data itself, and data acquisition, or usage) involved in the technical solutions should comply with the requirements of corresponding laws and regulations, and relevant stipulations.

Several platforms allow users to upload images related to a specific object or subject, and these platforms use various algorithms or criteria to select and display the most relevant or appealing image to other users. Some e-commerce platforms allow users to upload multiple images of an item. The platforms typically display the first uploaded image but gives users the option to choose which one they want to highlight. In some news aggregation platforms, several images might be associated with a single article. These images may include stock photos, author-provided images, or automatically generated thumbnails from video content. The platform may use algorithms to determine which image to display in the preview.

In some related schemes, some platforms use engagement metrics such as clicks, views, and other user interactions to determine which image to display. These metrics help algorithms decide which image is likely to capture the attention of users, improve user engagement, and increase the likelihood of content being consumed. For example, the platforms track the click-through rate of images associated with a particular piece of content, such as an article, product, or video. The CTR represents the percentage of users who clicked on an image after it was displayed in a preview or feed. The image with the highest CTR over time is deemed the most engaging and is selected for display more frequently. In some other examples, the platforms use view counts as the primary metric to determine which image to display. Images that are viewed the most (e.g., either as part of a carousel or individually) gain higher priority in future presentations. The assumption is that images with more views are likely more interesting or relevant to the audience.

However, these schemes fail to fully account for the rich dimensions of image quality, such as whether the image includes a model or showcases a lifestyle. For long-tail products and new products, these schemes are inefficient in exploration, resulting in the potential appeal of these items being under-discovered and under-utilized.

Therefore, the implementations of the present disclosure provide a scheme for determining an image for display. A computing device may obtain a plurality of candidate images associated with an object, where the object may be a product, an article, a music, or a video, etc. The computing device may generate a prompt for a language model based on the plurality of candidate images. Then, the computing device may obtain a plurality of attractiveness ranks corresponding to the plurality of candidate images by feeding the prompt to the language model. The computing device may determine a plurality of probability distributions corresponding to the plurality of candidate images based on the plurality of attractiveness ranks. Subsequently, the computing device may determine a target image for display from the plurality of candidate images based on the plurality of probability distributions.

In this way, the language model can rank the candidate images by evaluating the attractiveness of these images. Thus, the most attractive images can get more display opportunities. In addition, the language model can comprehensively consider multiple image features, for example, human models, scenes, background environment in the candidate images, etc., to comprehensively evaluate the attractiveness of the candidate images, thereby the accuracy of the ranking result can be improved.

FIG. 1 illustrates an example environment 100 in which example implementations of the present disclosure may be implemented. As shown in FIG. 1, the environment 100 includes a computing device 102. The computing device 102 may be any device with computing capability. For example, the computing device 102 may include, but are not limited to, personal computers, server computers, handheld or laptop devices, mobile devices (such as mobile phones, personal digital assistants (PDAs), media players, etc.), multiprocessor systems, consumer electronics, computer wearable electronic devices, smart home devices, minicomputers, mainframe computers, edge computing devices, distributed computing environments including any of the above systems or devices, etc.

As shown in FIG. 1, the environment 100 includes an object 104. The object 104 may be one object in an object list displayed on a page of an application. For example, the object 104 may be a product on a product list page of an e-commerce application. Furthermore, the object 104 may be an article on an article list page of a news aggregation application. In addition, the object 104 may be a music (or a movie) on a music list page of a music application.

In the environment 100, the object 104 may be configured with a plurality of candidate images 106-1, 106-2, . . . , and 106-N (also collectively referred to as candidate images 106 herein). The candidate images 106 may be uploaded by a user to the platform with the object 104 or generated by the platform based on the content of the object 104. In the environment 100, the objective of the computing device 102 is selecting a target image from the candidate images 106 to display on the object list page to increase the probability of users interacting with the object 104 (e.g., clicking on the object 104).

As shown in FIG. 1, the computing device 102 may generate a prompt 108 based on the candidate images 106, and the generated prompt 108 may be input into a language model 110. The language model 110 may be a multi-modal large language model (LLM). A large language model is a type of artificial intelligence model designed to understand, generate, and manipulate human language. The large language model may be built using deep learning techniques, for example, transformer-based neural networks, and are trained on vast amounts of text data to learn patterns, grammar, facts, and the context of language. A multi-modal large language model is capable of processing and understanding multiple types of data including text and images, and integrating them in a coherent manner. The language model 110 may combine the ability to handle natural language tasks with the capability to interpret, analyze, and generate responses involving visual information. It should be understand that the language model 110 may be deployed on the computing device 102 locally, deployed on a remote server, or provided by a third-party provider in a form of application programming interfaces (APIs).

The prompt 108 is an input provided to the language model 110 that guides a response of the language model 110. The prompt 108 may instruct the language model 110 what kind of information or text output is expected. For example, the prompt 108 may include a description of task objective and a list of the candidate images 106. For example, the description of task objective may be ranking images by their attractiveness. In some implementations, in the prompt 108, the candidate images 106 may be provided in a form of uniform resource locators (URLs). In some implementations, in the prompt 108, the candidate images 106 may be provided in a form of texts describing the content in the images.

As shown in FIG. 1, the language model 110 may generate, according to the prompt 108, a plurality of attractiveness ranks 112-1, 112-2, . . . , and 112-N (also collectively referred to as attractiveness ranks 112 herein) for the candidate images 106. For example, the attractiveness rank 112-1 corresponds to the candidate image 106-1, the attractiveness rank 112-2 corresponds to the candidate image 106-2, and the attractiveness rank 112-N corresponds to the candidate image 106-N. For example, if the language model 110 determines that the candidate image 106-1 is more attractive than the candidate image 106-2, the attractiveness rank 112-1 for the candidate image 106-1 may be higher than the attractiveness rank 112-2 for the candidate image 106-2.

As shown in FIG. 1, the computing device 102 may obtain the attractiveness ranks 112 from the language model, and generate a plurality of probability distributions 114-1, 114-2, . . . , and 114-N (also collectively referred to as probability distributions 114 herein) for the candidate images 106 based on the attractiveness ranks 112. Then, the computing device 102 may determine a target image 116 from the candidate images 106 for display based on the probability distributions 114. Because the parameters of the probability distributions 114 are determined based on the attractiveness ranks 112, it is easier to sample larger values from the probability distributions 114 corresponding to the candidate images 106 with higher attractiveness ranks 112, such that the images with higher attractiveness ranks can get more opportunities of being selected as the target image 116.

After determining the target image 116, the computing device 102 may transmit the target image 116 to a user device. Therefore, the target image 116 may be displayed as a preview of the object 104 on the object list page in the application running on the user device. It should be understand that, in some implementations, the computing device 102 and the user device may be a same device.

In this way, the candidate images 106 with higher attractiveness ranks 112 can get more display opportunities, thereby the user experience can be improved. In addition, the language model 110 can comprehensively consider multiple image features, for example, models, scenes, background environment in the candidate images 106, etc., to comprehensively evaluate the attractiveness of the candidate images 106, thereby the accuracy of the attractiveness ranks 112 can be improved.

Figure 2:
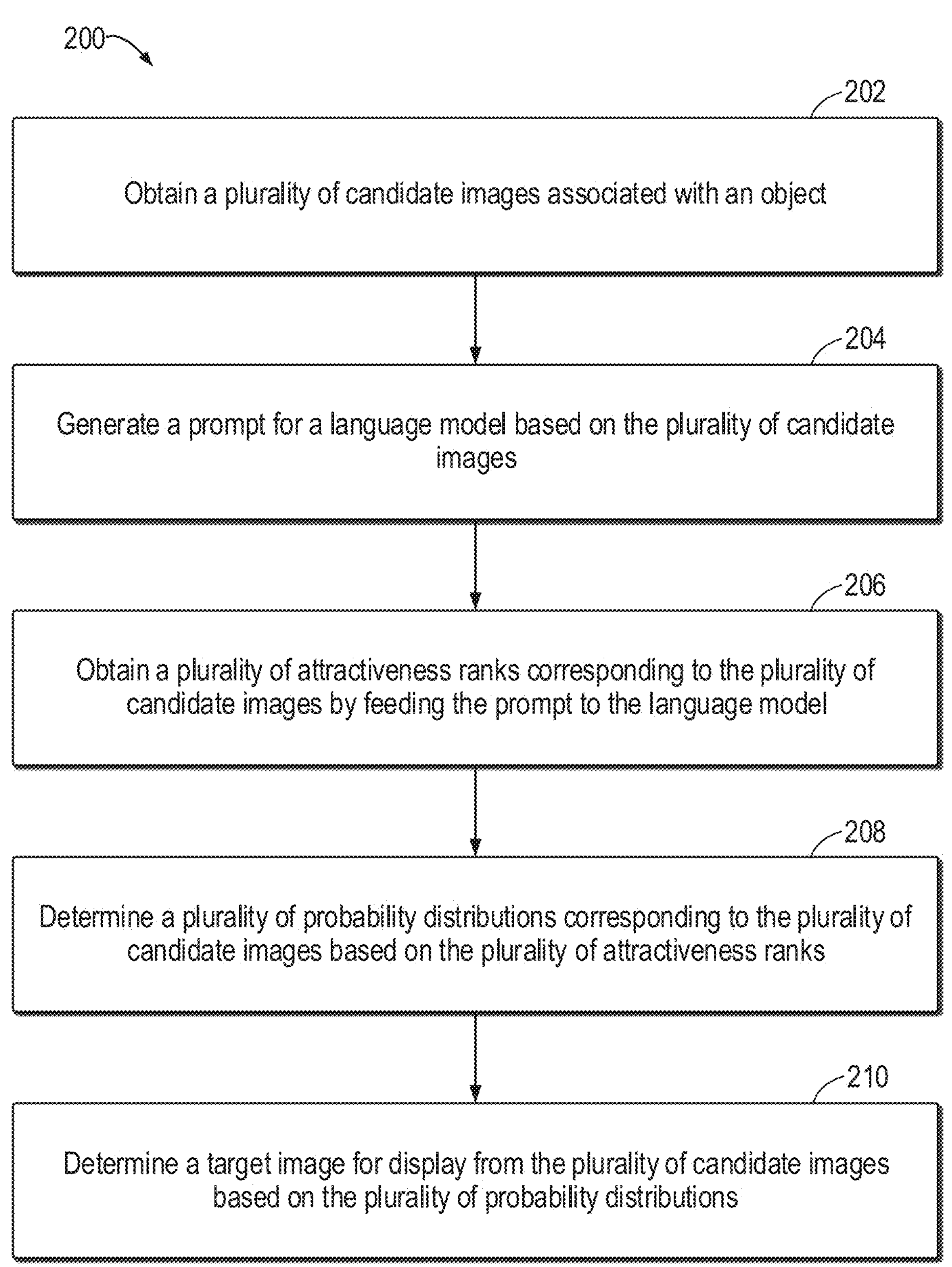
FIG. 2 is a flow chart illustrating an example process of determining an image for display according to some implementations of the present disclosure.

FIG. 2 is a flow chart illustrating an example process 200 of determining an image for display according to some implementations of the present disclosure. The process 200 may be implemented by a computing device (e.g., the computing device 102 in FIG. 1). As shown in FIG. 2, at block 202, the computing device may obtain a plurality of candidate images associated with an object. For example, in the environment 100, the object 104 may be one object in an object list displayed on a page of an application. The object 104 may be configured with the candidate images 106. The computing device 102 may obtain the candidate images 106 associated with the object 104.

At block 204, the computing device may generate a prompt for a language model based on the plurality of candidate images. For example, in the environment 100, the computing device 102 may generate a prompt 108 for the language model 110 based on the candidate images 106. The prompt 108 is an input provided to the language model 110 that guides a response of the language model 110. The prompt 108 may instruct the language model 110 what kind of information or text output is expected. For example, the prompt 108 may include a description of task objective and a list of the candidate images 106. For example, the description of task objective may be ranking images by their attractiveness. The list of the candidate images 106 may be a list of URLs or a list of descriptions.

At block 206, the computing device may obtain a plurality of attractiveness ranks corresponding to the plurality of candidate images by feeding the prompt to the language model. For example, in the environment 100, the computing device 102 may feed the prompt 108 into the language model 110. The language model 110 may generate, according to the prompt 108, the attractiveness ranks 112. For example, if the language model 110 determines that the candidate image 106-1 is more attractive than the candidate image 106-2, the attractiveness rank 112-1 for the candidate image 106-1 may be higher than the attractiveness rank 112-2 for the candidate image 106-2. Then, the computing device 102 may obtain the generated attractiveness ranks 112 from the language model 110.

At block 208, the computing device may determine a plurality of probability distributions corresponding to the plurality of candidate images based on the plurality of attractiveness ranks. For example, in the environment 100, the computing device 102 may determine the probability distributions 114 corresponding to the candidate images 106 based on the attractiveness ranks 112. The probability distributions 114 may be any distribution representing probabilities, such as a normal distribution, a Beta distribution, etc. The parameters of the probability distributions 114 for the candidate images 106 may be determined based on the probability distributions 114, such that these parameters may be different for different candidate images 106.

At block 210, the computing device may determine a target image for display from the plurality of candidate images based on the plurality of probability distributions.

For example, in the environment 100, the computing device 102 may determine the target image 116 from the candidate images 106 for display based on the probability distributions 114. Because the parameters of the probability distributions 114 are determined based on the attractiveness ranks 112, it is easier to sample larger values from the probability distributions 114 corresponding to the candidate images 106 with higher attractiveness ranks 112, such that the images with higher attractiveness ranks can get more opportunities of being selected as the target image 116.

In this way, the language model can rank the candidate images by evaluating the attractiveness of these images. Thus, the most attractive images can get more display opportunities. In addition, the language model can comprehensively consider multiple image features, for example, human models, scenes, background environment in the candidate images, etc., to comprehensively evaluate the attractiveness of the candidate images, thereby the accuracy of the ranking result can be improved.

Figure 3:
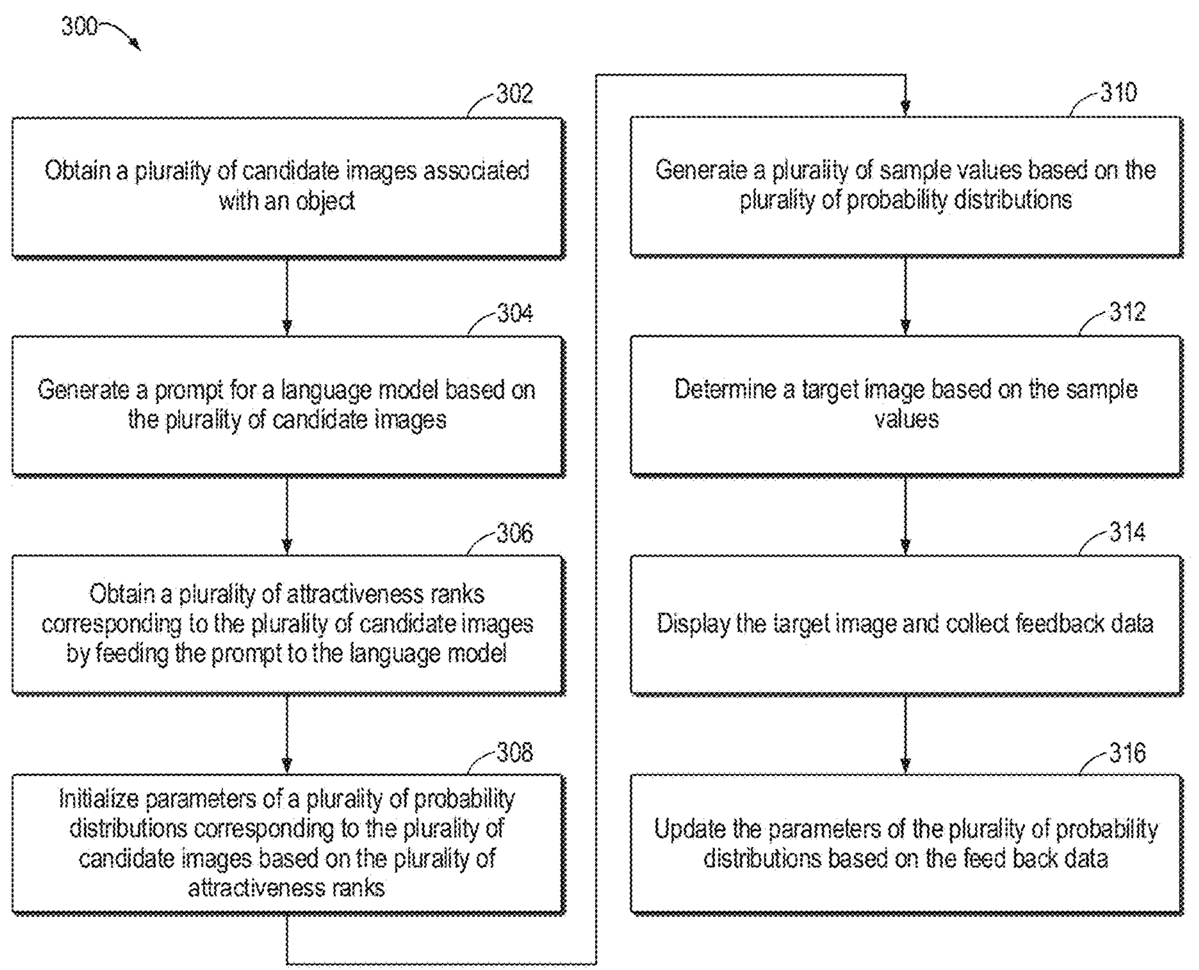
FIG. 3 is a flow chart illustrating another example process of determining an image to display according to some implementations of the present disclosure.

FIG. 3 is a flow chart illustrating another example process 300 of determining an image to display according to some implementations of the present disclosure. The process 300 may be implemented by a computing device (e.g., the computing device 102 in FIG. 1). As shown in FIG. 3, at block 302, the computing device may obtain a plurality of candidate images associated with an object. At block 304, the computing device may generate a prompt for a language model based on the plurality of candidate images. The prompt may include a description of task objective and the candidate images. For example, the description of task objective may be "rank the listed images by their attractiveness."

At block 306, the computing device may obtain a plurality of attractiveness ranks corresponding to the plurality of candidate images by feeding the prompt to the language model. In some implementations, the language model may score the attractiveness of the candidate images included in the prompt, and rank the candidate images based on their attractiveness scores. The images with greater attractiveness scores may have higher attractiveness ranks.

At block 308, the computing device may initialize parameters of a plurality of probability distributions corresponding to the plurality of candidate images based on the plurality of attractiveness ranks. In some implementations, the computing device may initialize a plurality of Beta distributions corresponding to the plurality of candidate images based on the plurality of attractiveness ranks.

The Beta distribution is a continuous probability distribution defined on the interval [0, 1]. The Beta distribution may be used to model probabilities or proportions, as it is well-suited for representing values that range between 0 and 1. The Beta distribution is parameterized by two positive shape parameters, denoted as an alpha parameter (i.e., $\alpha$) and a beta parameter (i.e., $\beta$), which control the shape of the distribution. The probability density function of the Beta distribution for a random variable x with parameters alpha> and beta>0 is given by Equation (1) at below:

$$f(x;\alpha,\beta)=\frac{x^{\alpha-1}(1-x)^{\beta-1}}{B(\alpha,\beta)} \tag{1}$$

where $0 \le x \le 1$, and $B(\alpha, \beta)$ is a Beta function, which normalizes the distribution and ensures that the total area under the curve is equal to 1. The Beta function is defend as Equation (2)

$$B(\alpha,\beta)=\int_0^1 t^{\alpha-1}(1-t)^{\beta-1}dt \tag{2}$$

The shape of the Beta distribution depends on the values of $\alpha$ and $\beta$. If $\alpha=\beta$, the distribution is symmetric around 0.5. When $\alpha=\beta=1$, the distribution becomes a uniform distribution on [0, 1]. If $\alpha>\beta$, the distribution is skewed toward 1, meaning it favors higher values. If $\alpha<\beta$, the distribution is skewed toward 0, meaning it favors lower values.

In some implementations, the alpha parameter may indicate a number of times that users interact with a candidate image, and the beta parameter may indicate a number of times that users have not interacted with the candidate image. In some implementations, the alpha parameters of the candidate images with higher attractiveness ranks may be initialized to higher values. For example, the plurality of candidate images may include a first candidate image and a second candidate image, where an attractiveness rank of the first candidate image may be higher than an attractiveness rank of the second candidate image. The alpha parameter of the first candidate image and the alpha parameter of the second candidate image may be initialized based on the attractiveness ranks of the first candidate image and the second candidate image, making a value of an alpha parameter corresponding to the first candidate image is greater than a value of an alpha parameter corresponding to the second candidate. In this way, the first candidate image with higher attractiveness rank can get more display opportunities than the second candidate image with lower attractiveness rank.

By leveraging the Beta distributions, it is flexible to update it with new data. As new successes (i.e., a user interacts with the image when the image is determined as the target image for display) or failures (i.e., a user has not interacted with the image when the image is determined as the target image for display) are observed, the alpha parameters and the beta parameters can be incremented, and the updated Beta distribution can reflect the feedback or interaction from the user.

At block 310, the computing device may generate a plurality of sample values based on the plurality of probability distributions. In some implementations, the computing device may generate a plurality of sample values corresponding to the plurality of candidate images by performing random samplings on the plurality of probability distributions respectively. Each of the plurality of sample values may indicate a probability of the corresponding image being interacted with by users. For example, the higher the sample value, the more likely the image is to be clicked on by users.

At block 312, the computing device may determine a target image based on the sample values. In some implementations, the computing device may determine a candidate image with a greatest sample value as the target image for display. In this way, compared to always displaying the image with highest attractiveness rank, the images with lower attractiveness ranks can get opportunities to display, the introduced randomness can help balance exploration and exploitation. While higher-probability images are likely to be shown, this approach still gives other images a change to be displayed. Therefore, this approach can avoid always selecting the highest-attractiveness images, allowing for better exploration of long-tail or new images that might also attract user interactions.

At block 314, the computing device may display the target image and collect feedback data. In some implementations, the computing device may transmit the determined target image to a user device for display, and receive a feedback data indicating whether a user has interacted with the target image. For example, the feedback data may indicate whether a user has clicked on the target image (or clicked on the object corresponding to the target image).

At block 316, the computing device may update the parameters of the plurality of probability distributions based on the feedback data. In some implementations, when the probability distribution is a Beta distribution, the computing device may increase the value of the alpha parameter of the Beta distribution if the feedback indicating that the user has interacted with the target image, or may increase the value of the beta parameter of the Beta distribution if the feedback data indicating that the user has not interacted with the target image. For example, after the target image being displayed, if the computing device receives a feedback data indicating that the user has clicked on the target image, the computing device may increase the alpha parameter of the Beta distribution of the target image by one. Otherwise, if the computing device receives a feedback data indicating that the user has not clicked on the target image, the computing device may increase the beta parameter of the Beta distribution of the target image by one.

By updating the parameters of the probability distributions in real-time, the system can dynamically adjust its probability estimates. This allows the system to more accurately estimate the attractiveness of the target image, thereby the most relevant or engaging images can be displayed more frequently.

Figure 4:
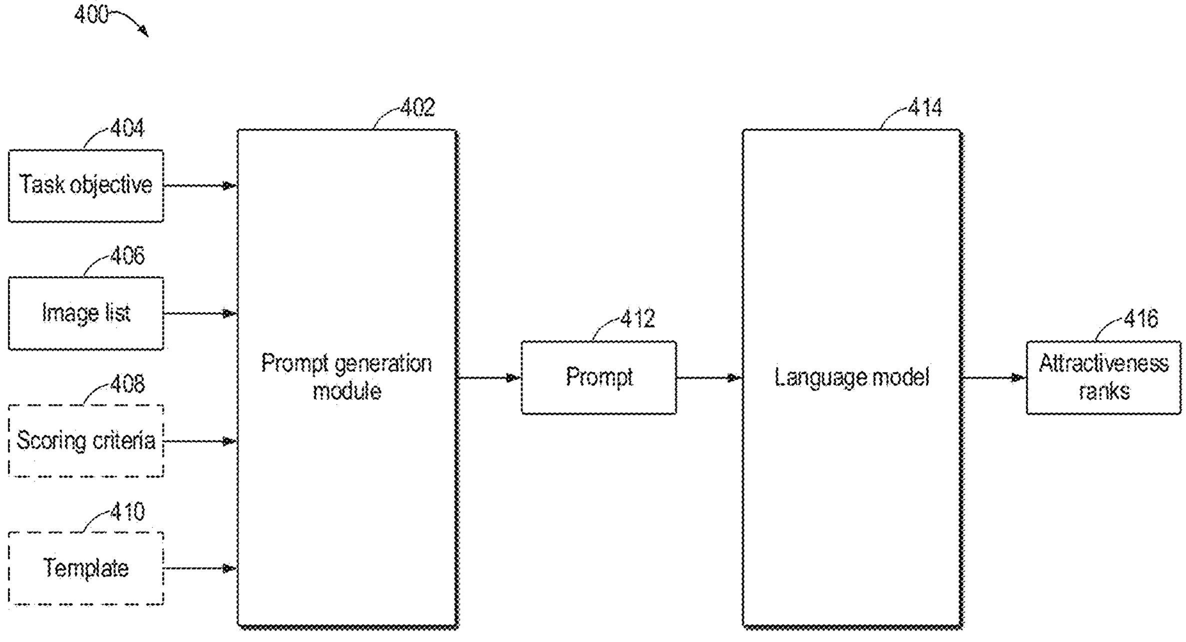
FIG. 4 is a schematic diagram illustrating an example of generating a plurality of attractiveness ranks for a plurality of candidate images by utilizing a language model according to some implementations of the present disclosure.

FIG. 4 is a schematic diagram illustrating an example 400 of generating a plurality of attractiveness ranks for a plurality of candidate images by utilizing a language model according to some implementations of the present disclosure. As shown in FIG. 4, the example 400 includes a prompt generation module 402 and a language model 414 (e.g., the language model 110 in FIG. 1). The prompt generation module 402 may receive a description of a task objective 404 and an image list 406. For example, the task objective may be ranking the listed images by their attractiveness, and the image list 406 may include a list of URLs of the candidate images. Then, the prompt generation module 402 may generate a prompt 412 based on the description of the task objective 404 and the image list 406. An example of the prompt 412 is provided at below:

Below are some images. Please score and rank them based on the attractiveness of each image. Please consider the following factors: whether there are models, whether it shows a life scene, the attractiveness of the background environment, the story and emotional resonance of the image, and the professional degree and beauty of the image. Please give each image a score of 1 to 10 and rank the images based on the score.

1. Image 1: [a URL of the image 1]
2. Image 2: [a URL of the image 2]

. . .

N. Image N: [a URL of the image N]

Please rank these images and rank them from high to low according to the score. For images with the same score, please rank them based on how attractive you think they are.

Start the analysis and output the results.

As shown in FIG. 4, the prompt 412 may be fed into the language model 414. Then, the language model 414 may generating attractiveness ranks 416 (e.g., the attractiveness ranks 112 in FIG. 1) for the images in the image list 406 according to the prompt 412.

In some implementations, the prompt generation module 402 may further receive a scoring criteria 408. The prompt generation module 402 may generate the prompt 412 based on the task objective 404, the image list 406, and the scoring criteria 408. The scoring criteria 408 may define how to score the attractiveness of images in the image list 406. For example, the scoring criteria 408 may define that the images with a human model are more attractive, or the scoring criteria 408 may define that the images with beautiful background environment are more attractive. In this way, the precision of the prompt 412 can be improved, thereby the accuracy of the attractiveness ranks 416 can also be improved.

In some implementations, the prompt generation module 402 may further receive a template 410. The prompt generation module 402 may generate the prompt 412 based on the task objective 404, the image list 406, the scoring criteria 408, and the template 410. The template 410 may define the format of the output of the language model 414. In some implementations, the template 410 may include a field of image identification and a field of attractiveness score. In this way, the language model 414 can output formatted attractiveness ranks 416. Therefore, the computing device can identify the attractiveness ranks 416 from the output of the language model 414 more accurate. Another example of the prompt 412, which is generated by the prompt generation module based on the task objective 404, the image list 406, the scoring criteria 408, and the template 410, is provided at below:

Below are some images. Please score and rank them based on the attractiveness of each image. Please consider the following factors: whether there are models, whether it shows a life scene, the attractiveness of the background environment, the story and emotional resonance of the image, and the professional degree and beauty of the image. Please give each image a score of 1 to 10 and rank the images based on the score.

1. Image 1: [a URL of the image 1]
2. Image 2: [a URL of the image 2]

. . .

N. Image N: [a URL of the image N]

Scoring criteria:

Model: images with models are more attractive.

Life scenes: images presenting objects in life scenes are more attractive.

Background environment: images with beautiful and attractive background environments are more attractive.

Storytelling and emotional resonance: images that can tell stories or evoke emotional resonance are more attractive.

Professional and beauty: images with professional photography and beautiful composition are more attractive.

Please output the results in the following format:

1. Image identification: image 1, score: X.X
2. Image identification: image 2, score: X.X

. . .

N. Image identification: image N, score: X.X

Please rank these images and rank them from high to low according to the score. For images with the same score, please rank them based on how attractive you think they are.

Start the analysis and output the results.

An example output of the language model 414 is provided at below:

1. Image identification: image 1, score: 9.5
2. Image identification: image 2, score: 9.0

. . .

N. Image identification: image N, score: 7.0

Figure 5:
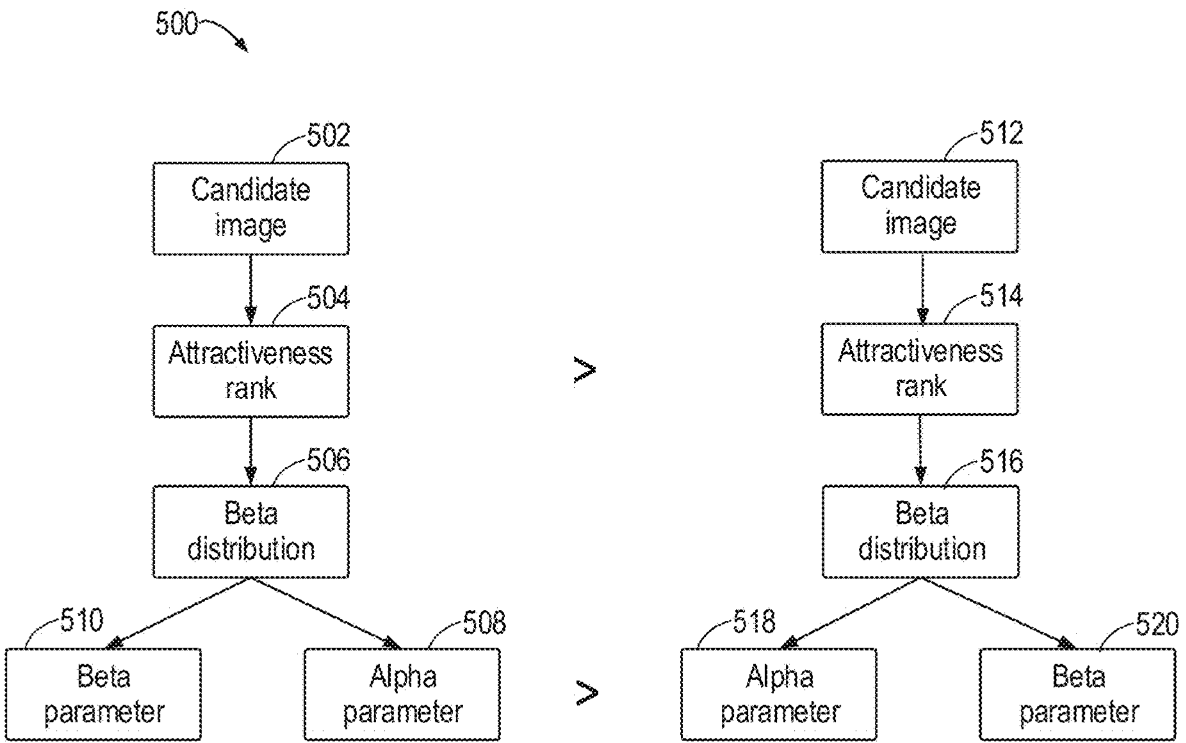
FIG. 5 is a schematic diagram illustrating an example of initializing a plurality of Beta distributions for a plurality of candidate images according to some implementations of the present disclosure.

FIG. 5 is a schematic diagram illustrating an example 500 of initializing a plurality of Beta distributions for a plurality of candidate images according to some implementations of the present disclosure. As shown in FIG. 5, the example 500 includes a candidate image 502 and a candidate image 512, where the candidate image 502 and the candidate image 512 are two of candidate images associated with a same object. The computing device may obtain an attractiveness rank 504 for the candidate image 502 and an attractiveness rank 514 for the candidate image from a language model.

In the example 500, the computing device may initialize a Beta distribution 506 for the candidate image 502 and a Beta distribution 516 for the candidate image 512. As shown in FIG. 5, the Beta distribution 506 includes an alpha parameter 508 and a beta parameter 510, and the Beta distribution 516 includes an alpha parameter 518 and a beta parameter 520. The alpha parameter 508 and the alpha parameter 518 may be initialized by the following Equation (3):

$$\text{alpha}(i) = \text{alpha\_initial\_value} * (1.0 - i/\text{num\_images}) \quad (3)$$

where alpha_initial_value denotes an initial value for all alpha parameters (e.g., 1.0), i denotes the rank of the image, and num_images denotes the total number of the candidate images associated to the same object.

Furthermore, the beta parameter 510 and the beta parameter 520 may be initialized by the following Equation (4):

$$\text{beta}(i) = \text{beta\_initial\_value} * (i/\text{num\_images}) \quad (4)$$

where betga_initial_value denotes an initial value for all beta parameters (e.g., 1.0).

In the example 500, the attractiveness rank 504 of the candidate image 502 is higher than the attractiveness rank 514 of the candidate image 512. For example, the candidate image 502 is the highest ranked of five candidate images, and the candidate image 512 is the second highest ranked of the five candidate images. According to Equation (3), the alpha parameter 508 may be initialized to 4/5, and the alpha parameter 518 may be initialized to 3/5. Furthermore, according to Equation (4), the beta parameter 510 may be initialized to 1/5, and the beta parameter 520 may be initialized to 2/5. In this way, when the computing device performing random samplings on the Beta distribution 506 and the Beta distribution 516, the sample value from the Beta distribution 506 is more likely greater than the sample value from the Beta distribution 516. Thus, the candidate image 502 with higher attractiveness rank can get more opportunities to be displayed than the candidate image 512.

Figure 6:
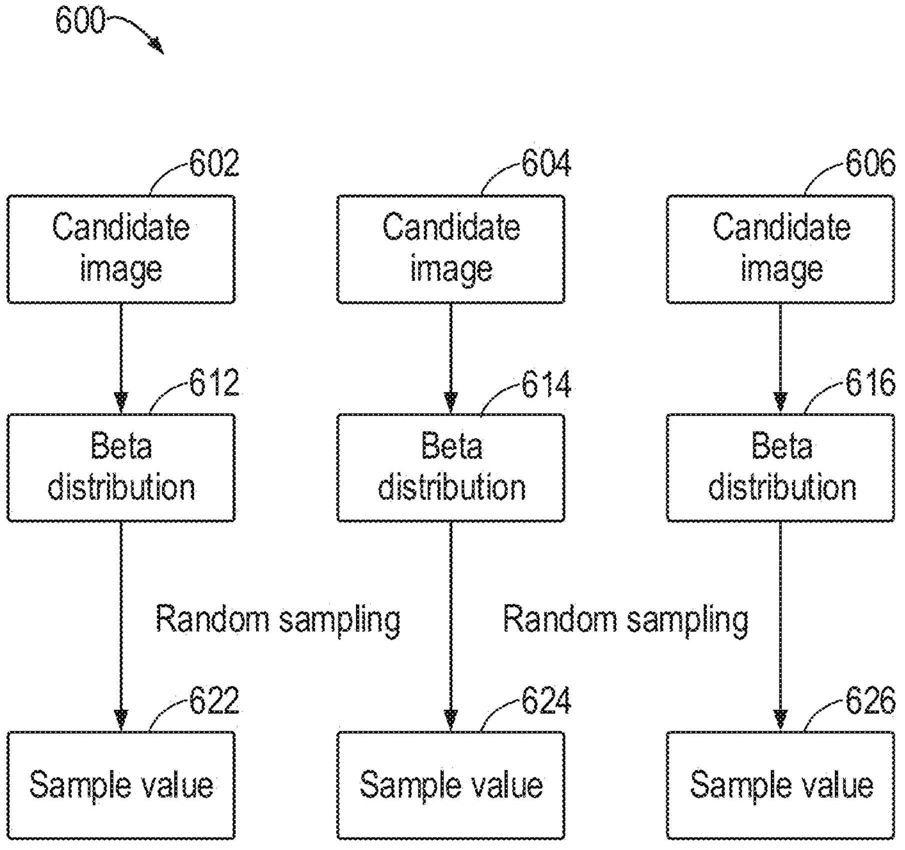
FIG. 6 is a schematic diagram illustrating an example of generating a plurality of sample values for a plurality of candidate images according to some implementations of the present disclosure.

FIG. 6 is a schematic diagram illustrating an example 600 of generating a plurality of sample values for a plurality of candidate images according to some implementations of the present disclosure. As shown in FIG. 6, the example 600 includes candidate images 602, 604, and 606, and they are candidate images associated with a same object. The computing device may generate a Beta distribution 612 for the candidate image 602, a Beta distribution 614 for the candidate image 604, and a Beta distribution 616 for the candidate image 606. Then, the computing device may perform random samplings on the Beta distributions 612, 614, and 616 to obtain sample values 622, 624, and 626. Each of these sample values may indicate a probability of the corresponding image being interacted with by users. For example, the higher the sample value, the more likely the image is to be clicked on by users.

Figure 7:
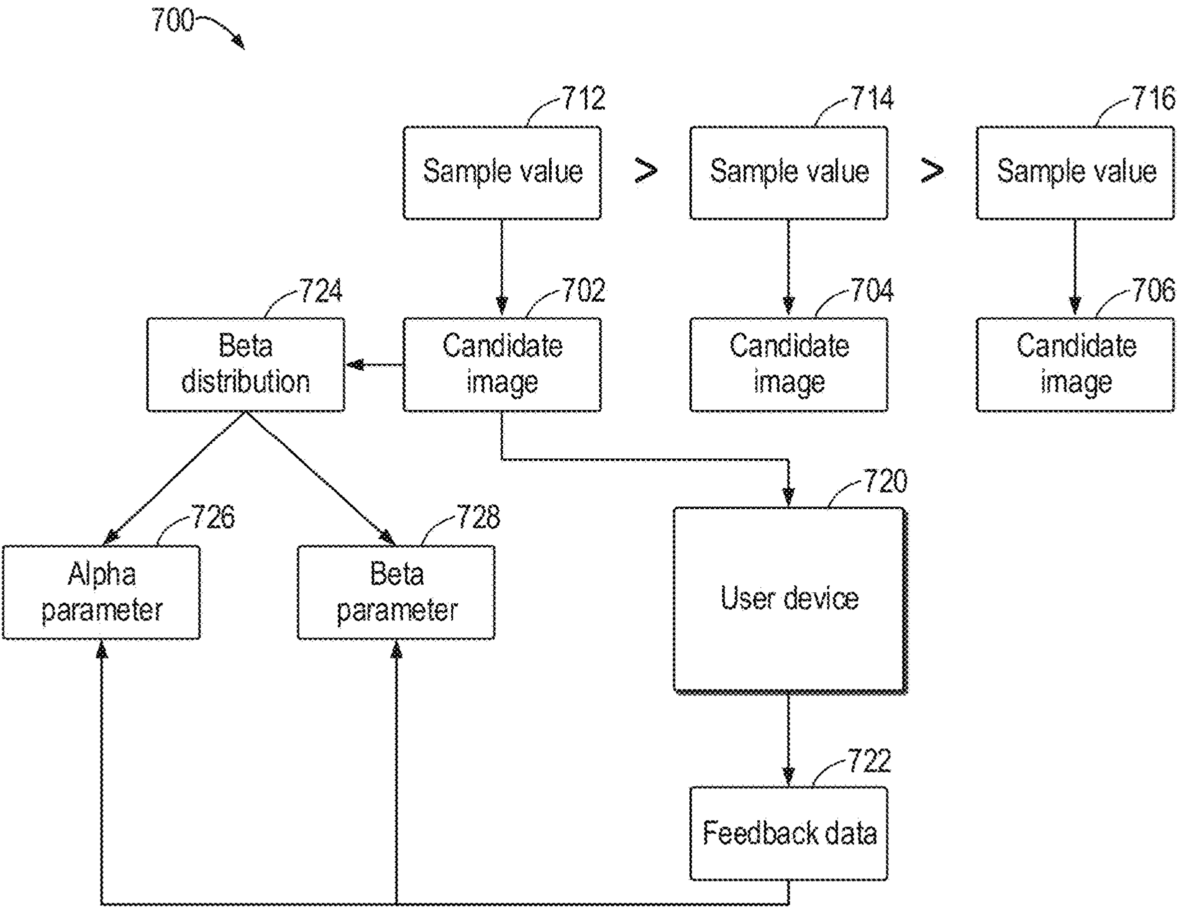
FIG. 7 is a schematic diagram illustrating an example of determining a target image for display and updating parameters associated with the target image according to some implementations of the present disclosure.

FIG. 7 is a schematic diagram illustrating an example 700 of determining a target image for display and updating parameters associated with the target image according to some implementations of the present disclosure. As shown in FIG. 7, the example 700 includes candidate images 702, 704, and 706, and they are candidate images associated with a same object. The computing device has generated a sample value 712 for the candidate image 702, a sample value 714 for the candidate image 704, and a sample value 716 for the candidate image 706.

In the example 700, the sample value 712 is the largest value. Therefore, the computing device may determine the candidate image 702 as the target image for display. As shown in FIG. 7, the computing device may transmit the candidate image 702 to a user device 720. The user device 720 may display the candidate image 702 on an object list page in an application. The user device 720 may monitor whether the user has interacted with the object associated with the candidate image 702, and store the monitor result as feedback data 722. The computing device may obtain the feedback data 722, and update a Beta distribution 724 of the candidate image 702 based on the feedback data 722.

As shown in FIG. 7, the Beta distribution 724 includes an alpha parameter 726 and a beta parameter 728. If the feedback data 722 indicates that the user has interacted with the corresponding object, the computing device may increase the alpha parameter 726 of the Beta distribution 724 by a predetermined value (e.g., one). Otherwise, if the feedback data 722 indicates that the user has not interacted with the object, the computing device may increase the beta parameter 728 of the Beta distribution 724 by the predetermined value.

In this way, the parameters of Beta distribution 724 can be dynamically adjusted based on the display effect of the candidate image 702. This allows the computing device to more accurately estimate the attractiveness of the candidate image 702, thereby the most relevant or engaging images can be displayed more frequently.

Figure 8:
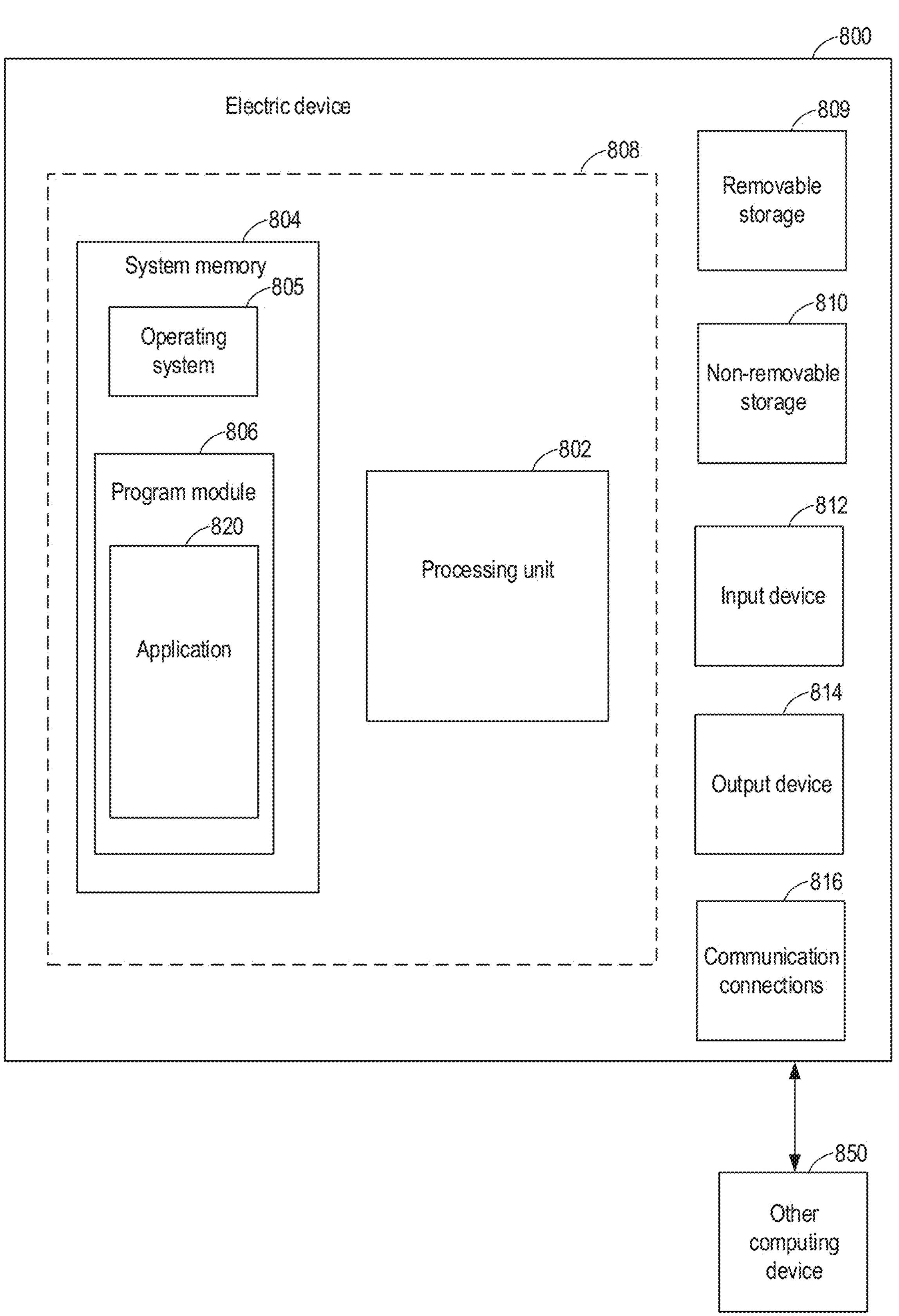
FIG. 8 is a block diagram illustrating physical components (for example hardware) of an electronic device with which aspects of the present disclosure may be practiced.

FIG. 8 is a block diagram illustrating physical components (e.g., hardware) of an electronic device 800 with which aspects of the disclosure may be practiced. For example, the electronic device 800 may be the computing device 102 in FIG. 1, and the electronic device 800 may implements the processes as depicted in FIGS. 1-7. In a basic configuration, the electric device 800 may include at least one processing unit 802 and a system memory 804. Depending on the configuration and type of computing device, the system memory 804 may comprise, but is not limited to, volatile storage (e.g., random access memory), nonvolatile storage (e.g., read-only memory), flash memory, or any combination of such memories.

The system memory 804 may include an operating system 805 and one or more program modules 806 suitable for performing the various aspects disclosed herein such. The operating system 805, for example, may be suitable for controlling the operation of the electric device 800. Furthermore, aspects of the disclosure may be practiced in conjunction with other operating systems, or any other application program and is not limited to any particular application or system. This basic configuration is illustrated in FIG. 8 by those components within a dashed line 808. The electric device 800 may have additional features or functionality. For example, the electric device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, several program modules and data files may be stored in the system memory 804. While executing on the at least one processing unit 802, an application 820 or program modules 806 may perform processes including, but not limited to, one or more aspects, as described herein. The application 820 may include an application interface 821 which may be the same as or similar to the application interface 821 as previously described in more detail with regard to FIGS. 1-7. Other program modules that may be used in accordance with aspects of the present disclosure may include electronic mail and contacts applications, word processing applications, spreadsheet applications, database applications, slide presentation applications, drawing or computer-aided application programs, etc., and/or one or more components supported by the systems described herein.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the processing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The electric device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The processing device 500 may include one or more communication connections allowing communications with other computing or processing devices 850. Examples of suitable communication connections include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electric device 800. Any such computer storage media may be part of the electric device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Any of the steps, functions, and operations discussed herein can be performed continuously and automatically.

The exemplary systems and methods of this disclosure have been described in relation to computing devices. However, to avoid unnecessarily obscuring the present disclosure, the preceding description omits several known structures and devices. This omission is not to be construed as a limitation. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed configurations and aspects.

Several variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a non-transitory storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

The disclosure is not limited to standards and protocols if described. Other similar standards and protocols not mentioned herein are in existence and are included in the present disclosure. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub-combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving case, and/or reducing cost of implementation.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A method for determining an image for display, comprising:

obtaining a plurality of candidate images associated with an object;

generating a prompt for a language model based on the plurality of candidate images;

obtaining a plurality of attractiveness ranks corresponding to the plurality of candidate images by feeding the prompt to the language model;

determining a plurality of probability distributions corresponding to the plurality of candidate images based on the plurality of attractiveness ranks; and determining a first image for display from the plurality of candidate images based on the plurality of probability distributions;

wherein determining the first image for display from the plurality of candidate images based on the plurality of probability distributions comprises:

generating a plurality of sample values corresponding to the plurality of candidate images by performing random samplings on the plurality of probability distributions respectively; and determining the first image from the plurality of candidate images based on the plurality of sample values.

2. The method of claim 1, wherein generating the prompt for the language model based on the plurality of candidate images comprises:

obtaining a description of task objective;

obtaining an image list based on the plurality of candidate images; and generating the prompt based on the description of task objective and the image list.

3. The method of claim 2, wherein generating the prompt based on the description of task objective and the image list comprises:

obtaining scoring criteria associated with the object; and generating the prompt based on the description of task objective, the image list, and the scoring criteria.

4. The method of claim 3, wherein generating the prompt based on the description of task objective, the image list, and the scoring criteria comprises:

obtaining a template of output, the template of output comprising a field of image identification and a field of attractiveness score; and generating the prompt based on the description of task objective, the image list, the scoring criteria, and the template of output.

5. The method of claim 1, wherein determining the first image from the plurality of candidate images based on the plurality of sample values comprises:

determining a candidate image with a greatest sample value as the first image.

6. The method of claim 1, wherein generating the plurality of probability distributions corresponding to the plurality of candidate images based on the plurality of probability distributions comprises:

generating a plurality of Beta distributions corresponding to the plurality of candidate images based on the plurality of attractiveness ranks, a Beta distribution of the plurality of Beta distributions comprising an alpha parameter and a beta parameter, the alpha parameter indicating a number of times that users interact with a candidate image, the beta parameter indicating a number of times that users have not interacted with the candidate image.

7. The method of claim 6, wherein the plurality of candidate images comprises a first candidate image and a second candidate image, an attractiveness rank of the first candidate image is higher than an attractiveness rank of the second candidate image, and generating the plurality of Beta distributions corresponding to the plurality of candidate images based on the plurality of attractiveness ranks comprises:

initializing a plurality of alpha parameters of the plurality of Beta distributions based on the plurality of attractiveness ranks, wherein a value of an alpha parameter corresponding to the first candidate image is greater than a value of an alpha parameter corresponding to the second candidate image.

8. The method of claim 7, further comprises:

transmitting the first image to a user device for display;

receiving a feedback data, the feedback data indicating whether a user has interacted with the first image; and updating a first Beta distribution corresponding to the first image based on the feedback data.

9. The method of claim 8, wherein updating the first Beta distribution corresponding to the first image based on the feedback data comprises:

increasing a value of an alpha parameter of the first Beta distribution in response to the feedback data indicating that the user has interacted with the first image; and increasing a value of a beta parameter of the first Beta distribution in response to the feedback data indicating that the user has not interacted with the first image.

10. An electronic device, comprising:

a memory and a processor;

wherein the memory is configured to store one or more computer instructions which, when executed by the processor, cause the processor to:

obtain a plurality of candidate images associated with an object;

generate a prompt for a language model based on the plurality of candidate images;

obtain a plurality of attractiveness ranks corresponding to the plurality of candidate images by feeding the prompt to the language model;

determine a plurality of probability distributions corresponding to the plurality of candidate images based on the plurality of attractiveness ranks; and determine a first image for display from the plurality of candidate images based on the plurality of probability distributions;

wherein the one or more computer instructions causing the processor to determine the first image for display from the plurality of candidate images based on the plurality of probability distributions further cause the processor to:

generate a plurality of sample values corresponding to the plurality of candidate images by performing random samplings on the plurality of probability distributions respectively; and determine the first image from the plurality of candidate images based on the plurality of sample values.

11. The device of claim 10, wherein the one or more computer instructions causing the processor to generate the prompt for the language model based on the plurality of candidate images further cause the processor to:

obtain a description of task objective;

obtain an image list based on the plurality of candidate images; and generate the prompt based on the description of task objective and the image list.

12. The device of claim 11, wherein the one or more computer instructions causing the processor to generate the prompt based on the description of task objective and the image list further cause the processor to:

obtain scoring criteria associated with the object; and generate the prompt based on the description of task objective, the image list, and the scoring criteria.

13. The device of claim 12, wherein the one or more computer instructions causing the processor to generate the prompt based on the description of task objective, the image list, and the scoring criteria further cause the processor to:

obtain a template of output, the template of output comprising a field of image identification and a field of attractiveness score; and generate the prompt based on the description of task objective, the image list, the scoring criteria, and the template of output.

14. The device of claim 10, wherein the one or more computer instructions causing the processor to determine the first image from the plurality of candidate images based on the plurality of sample values further cause the processor to:

determine a candidate image with a greatest sample value as the first image.

15. The device of claim 10, wherein the one or more computer instructions causing the processor to generate the plurality of probability distributions corresponding to the plurality of candidate images based on the plurality of probability distributions further cause the processor to:

generate a plurality of Beta distributions corresponding to the plurality of candidate images based on the plurality of attractiveness ranks, a Beta distribution of the plurality of Beta distributions comprising an alpha parameter and a beta parameter, the alpha parameter indicating a number of times that users interact with a candidate image, the beta parameter indicating a number of times that users have not interacted with the candidate image.

16. The device of claim 15, wherein the plurality of candidate images comprises a first candidate image and a second candidate image, an attractiveness rank of the first candidate image is higher than an attractiveness rank of the second candidate image, and the one or more computer instructions causing the processor to generate the plurality of Beta distributions corresponding to the plurality of candidate images based on the plurality of attractiveness ranks further cause the processor to:

initialize a plurality of alpha parameters of the plurality of Beta distributions based on the plurality of attractiveness ranks, wherein a value of an alpha parameter corresponding to the first candidate image is greater than a value of an alpha parameter corresponding to the second candidate image.

17. The device of claim 16, wherein the one or more computer instructions further cause the processor to:

transmit the first image to a user device for display;

receive a feedback data, the feedback data indicating whether a user has interacted with the first image; and update a first Beta distribution corresponding to the first image based on the feedback data.

18. A non-transitory computer-readable medium comprising instructions stored thereon which, when executed by a processor, cause the processor to:

obtain a plurality of candidate images associated with an object;

generate a prompt for a language model based on the plurality of candidate images;

obtain a plurality of attractiveness ranks corresponding to the plurality of candidate images by feeding the prompt to the language model;

determine a plurality of probability distributions corresponding to the plurality of candidate images based on the plurality of attractiveness ranks; and determine a first image for display from the plurality of candidate images based on the plurality of probability distributions;

wherein the instructions causing the processor to determine the first image for display from the plurality of candidate images based on the plurality of probability distributions further cause the processor to:

generate a plurality of sample values corresponding to the plurality of candidate images by performing random samplings on the plurality of probability distributions respectively; and determine the first image from the plurality of candidate images based on the plurality of sample values.

* * * * *